United States Patent [19]

Mahood

[11] 3,812,472

[45] May 21, 1974

[54] NOISE REJECTING, DEMAND VARIABLE REAL TIME CLOCK

[75] Inventor: James A. Mahood, Salt Lake City, Utah

[73] Assignee: Bio-Logics Systems, Inc., Salt Lake City, Utah

[22] Filed: Oct. 24, 1972

[21] Appl. No.: 300,065

[52] U.S. Cl. .......... 340/172.5
[51] Int. Cl. .......... G06f 9/18
[58] Field of Search .......... 340/172.5

[56] References Cited

UNITED STATES PATENTS

| | | | |
|---|---|---|---|
| 3,582,896 | 6/1971 | Silber | 340/172.5 |
| 3,626,385 | 12/1971 | Bouman | 340/172.5 |
| 3,716,837 | 2/1973 | Waddell | 340/172.5 |
| 3,697,959 | 10/1972 | Abramson et al. | 340/172.5 |
| 3,699,530 | 10/1972 | Capowski et al. | 340/172.5 |
| 3,639,909 | 2/1972 | Hauck et al. | 340/172.5 |
| 3,699,525 | 10/1972 | Klavins | 340/172.5 |
| 3,623,021 | 11/1971 | Haskin et al. | 340/172.5 |

*Primary Examiner*—Gareth D. Shaw
*Attorney, Agent, or Firm*—Lynn G. Foster

[57] ABSTRACT

Data acquisition units used with a computer, such as medical parameter input terminals, are sampled at 60 Hz as well as multiples and submultiples thereof, thereby to mitigate noise coupled to the input transmission lines from 60 Hz power lines and from fluorescent lighting. A 1920 Hz phase locked clock drives a frequency divider to provide signals at submultiples thereof (including 60 Hz as well as multiples and submultiples thereof), thereby providing a multifrequency real time clock source for sampling data channels. However, instead of causing a computer interrupt for the highest sampling rate of the real time clock and determining whether or not any interrupt is to take place at that frequency, interrupts are caused only at the highest currently-demanded sampling rate a hardware embodiment includes programmable multiplexers to select the clock frequency related to the desired sampling rate for each channel, programmable countdown for the number of samplings required at each channel, and priority means to sample the channels one at a time in an orderly sequence, regardless of frequency or time of starting of the sampling, the ignoring those channels for which sampling is not required. This aspect of the invention may be implemented in software utilizing a general purpose computer or a multipurpose mini-computer.

11 Claims, 3 Drawing Figures

NOISE REJECTING, DEMAND VARIABLE REAL TIME CLOCK

BACKGROUND

1. Field of Invention

This invention relates to data processing, and more particularly to a demand-variable real time clock for controlling the sampling of data channels by a computer and for minimizing 60Hz and 120Hz noise in the sampled data.

2. Prior Art

In the data processing arts, the sampling of input data channels on a real time basis is frequently required. As an example, when collecting data relating to biological or health parameters, such as e.k.g., the data must be sampled at a rate bearing a time relationship to the wave forms which are to be derived therefrom. In large scale data processing systems, the data acquisition units (such as an e.k.g. machine) may be connected through multiplexing equipment to data input channels. In such a case, the data input channel will collect such data as required for a given sampling of the unit, and then cause but a single interruption to the computer to have the computer receive all the data on a non-real time basis. But in the case of mini-computers, and other computers which do not have input/output channels, it is necessary to interrupt the computer once for each sampling of the input channel. This necessarily detracts from time which the computer may use for other necessary processing, and can cause the computer to become over burdened with tasks when maximum sampling demands are being made thereon. Naturally, when real time sampling is required (such as in a medical environment), the computer either has to be of a large size and high speed, the number of channels which may be sampled must be limited, or some other provision must be made in order to maximize the ability of a given computer to receive data on a real time basis.

Another problem relating to the sampling of data from input units relates to noise coupled into the signal lines which interconnect the computer with a data input unit. One source of such noise is 60 Hz power lines in a vicinity of the lines of the input unit. Another source of noise is 120 Hz noise from fluorescent lighting fixtures. Heretofore, mitigation of problems relating to 60 Hz noise has required complex and expensive equipment and expensive signal lines.

SUMMARY OF THE INVENTION

A principal object of the present invention is the control of the sampling of data input channels in a computer in response to a demand variable real time clock.

Another important object of the present invention is the reduction of noise in the data signals received by a computer from data input devices.

According to a first aspect of the present invention, a method of controlling the sampling of data input channels at different rates in response to a real time clock includes provision of a real time clock providing a plurality of output frequencies, all of which are multiples of the lowest frequency output thereof, associating the sampling of each channel with a particular frequency at which it is to be sampled, registering a demand for the sampling of any channel and thereby causing the computer to provide a channel sample interrupt at the frequency equal to, but no higher than, the frequency required for the one of all the channels currently requiring sampling which has the highest required sampling rate.

In accordance with another feature of the invention, the real time clock provides frequencies which are 60 Hz and multiples and submultiples thereof.

The present invention permits interrupting the computer at a rate no greater than the rate required for the channel currently demanding sampling. As demands for various channels are made and are satisfied, the rate of interruptions of the computer may change instantaneously, without interruption of the sampling of other channels. Because of this, the sampling of channels is self synchronizing. The invention permits avoiding automatic interruptions to test for channel demands, thereby reducing the processing time which a computer must devote to channel demands. Even when demands for sampling are being made with respect to certain channels, interruptions are no more frequent than is required for the one of the channels demanding sampling which has the highest sampling rate. The invention permits maximum utilization of computer time, thereby permitting a given computer to handle a greater amount of data input channel sampling and processing, while not mitigating the real time demands of data input channels. The invention, by providing for all of the sampling frequencies to be multiples and submultiples of each other permits self synchronizing switching from one sampling rate to another. By rendering all sampling frequencies to be multiples and submultiples of 60 Hz, noise is induced in the data input channels by power lines and fluorescent lighting is minimized.

The present invention is readily implemented in a computer by means of software utilizing programming techniques which are well known in the art. On the other hand, the computer may employ a relatively simple hardware of the type which is readily assembled from components available in the art. Utilization of the invention is not dependent upon the formchosen for the implementation thereof.

Other objects, features and advantages of the present invention will become more apparent in light of the following exemplary embodiments thereof, as illustrated in the accompanying drawings.

DESCRIPTION OF THE EMBODIMENTS

Figures 1, 2:
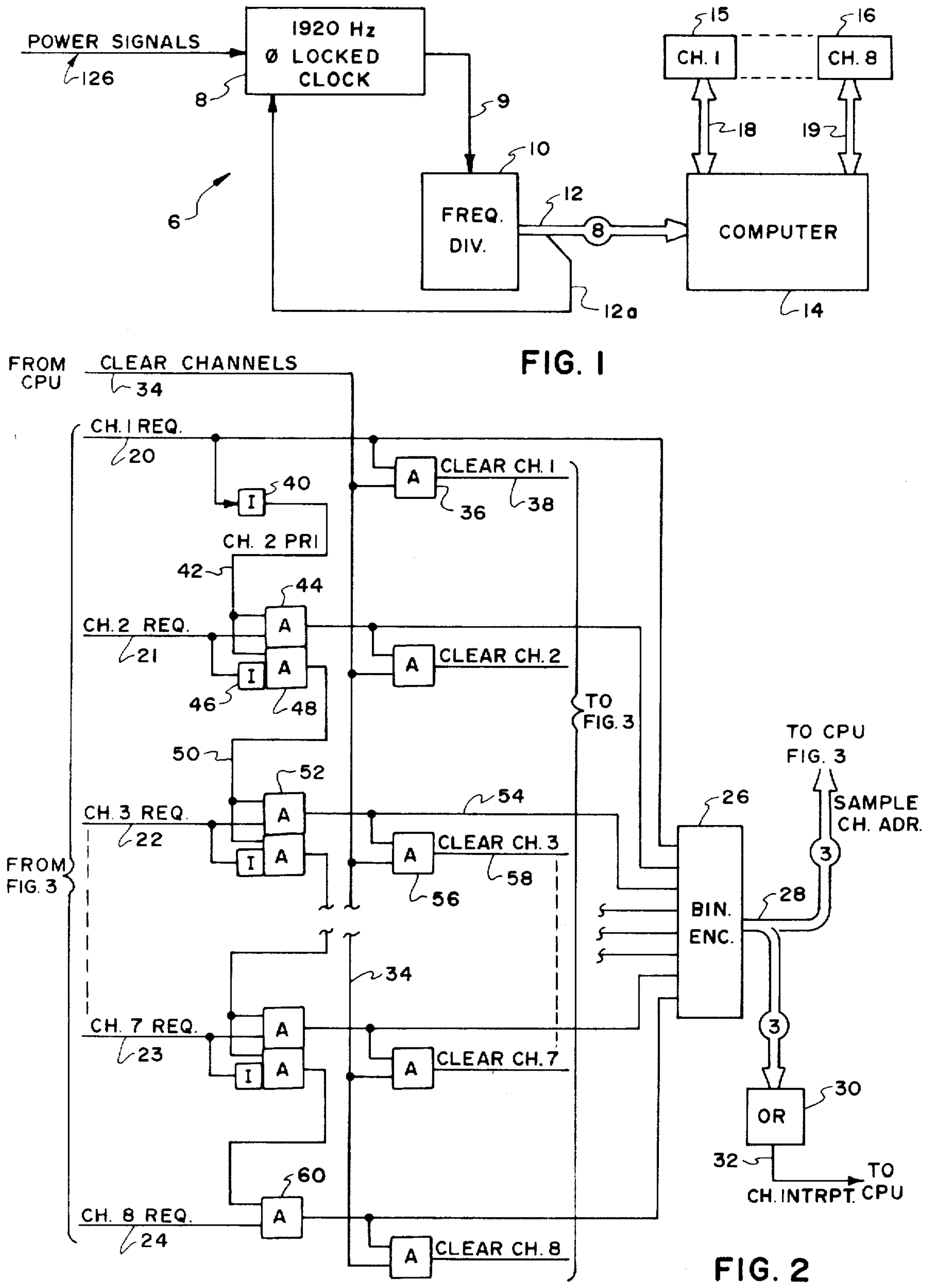
FIG. 1 is a simplified schematic block diagram of data processing apparatus which may incorporate the present invention.
FIG. 2 is a schematic block diagram of an exemplary priority circuit which may be used in implementing the present invention.

Referring now to FIG. 1, the present invention comprises a real time clock 6 which includes a phase locked clock that provides over its output line 9 a signal at a frequency of 1,920 Hz to a frequency divider 10 which divides the frequency by multiples of two so as to provide on eight output lines 12 submultiples of the 1,920 Hz signal on the line 9 and 1,920 Hz. A 60 Hz signal on a line **12*a* and a 60 Hz power signal are used as the reference signals for phase locking the clock 8. The various frequencies of the real time clock 6 are fed over the lines 12 to a computer 14 which uses the signals on the line 12 to time interrupts for sampling a plurality of channels 15, 16 which are interconnected with the computer by related signal lines 18, 19. The present invention has greatest utility working in a computer which must sample data input channels on a real time basis, at different sampling rates. For instance, consider that channel 1 in FIG. 1 is a data input channel connected to an e.k.g. machine. It has been found that a sampling rate of 240 Hz is suitable to provide sufficient data points to indicate to the computer the nature of the heart wave. On the other hand, channel 8 in FIG. 1 may be connected to a spirometer, a machine which measures a patient's lung volume and forced volume, and so forth. It has been found that sampling of spirometer data at 60 Hz is adequate. If channel 1 and channel 8 are to allow maximum unfettered usage of the e.k.g. machine and the spirometer, then it is necessary that either be able to initiate the sampling of data at an moment in time when a technician has determined that conditions are proper for the beginning of data sampling. Thus it becomes necessary to accommodate, albeit at electronic speeds, receipt of demands for sampling of channels on a random time basis. If only channel 8 were currently demanding to be sampled, then the real time clock need only provide interruptions at 60 Hz; on the other hand, if only channel 1 required sampling, then the phase lock clock 6 need only provide interruption-inducing clock signals at 240 Hz. If both channel 1 and channel 8 require samplging at the same time, then the 60 Hz sampling of channel 8 must be synchronized with ultimate samples of the 240 Hz sampling of channel 1. If the computer were to receive clock signals at the 240 Hz rate while only channel 8 required sampling, then every ultimate clock pulse would induce and interrupt simply for the purpose of determining that no channel required sampling at that time. In addition to channel 1 and channel 8, there may, of course, be additional channels which may or may not require sampling at any given time, and which may operate at the same frequency as channel 8, the same as channel 1**, or still another frequency. In order to insure that any channel, whether at the same frequency as another channel or not, and regardless of the time at which sampling of that channel commenced and the number of samples to be taken for that channel in response to a signal initial demand therefore, it is necessary to provide some order in the mode of the sampling of the channels which takes in account whether or not a given channel requires sampling, and, in accordance with the invention, the desire not to interrupt the computer for the sampling of channels at any rate higher than the highest rate required by any channel currently demanding to be sampled.

Referring now to FIG. 2, an exemplary priority circuit which accommodates the foregoing needs for an orderly control over the utilization of a variable frequency real time clock in causing channel sampling interrupts includes a plurality of input lines 20–24 (and similar other lines not shown herein for simplicity), each of which is an indication that a given channel requires sampling on a current clock pulse from the real time clock 6. The signals on the lines 20–24 are generated in FIG. 3 in a manner to be described hereinafter. For instance, when a signal appears on the line 20, it indicates that sampling of channel 1 is required, and the necessary number of samples have not yet been taken, as well as that a current clock pulse is at the frequency at which channel 1 is to be sampled. When there is a signal on the line 20, it is provided to the input of a binary encoder 26 which encodes a channel 1 request into a three bit binary code of the address of channel 1 (which many, for instance, be $\mathbf{001_2}$) on a trunk of three lines 28 which are provided to the central processing unit of the computer 14 as well as to FIG. 3 (for purposes to be described hereinafter). If desirable, the three bit channel request address on the lines 28 may also be passed to an OR circuit 30 to generate a signal on a line 32 for application to the central processing unit to indicate that a channel sampling interruption is being demanded. Alternatively, the mere presence of an address on lines 28 may be utilized by the CPU to initiate an interrupt in any fashion which is compatible with the operation.

Once the sampling of channel 1 is completed in the CPU, the CPU will provide a signal on a line 34 indicating that the request for a channel sampling interruption for channel 1 is acknowledged, or complete, depending upon the nature of handling of interruptions in the CPU. In response to this signal, an AND circuit 36, responding also to the continued presence of the channel 1 request signal on line 20, will generate a clear channel 1 signal on a line 38, which is applied to FIG. 3 and turns off the channel 1 request signal on the line 20, in a manner to be described hereinafter. Assume now that there is no current channel 2 request but there is a current channel 3 request. When the channel 1 request signal disappears, an inverter 40 will provide a channel 2 priority signal on a line 42 which will not activate an AND circuit 44 due to the lack of a channel 2 request signal on the line 21. However, the lack of a signal on line 21 will cause an inverter 46 to enable an AND circuit 48 which responds to the channel 2 priority signal on the line 42 to generate a channel 3 priority circuit on a line 50. This, together with a channel 3 request circuit on a line 22 will cause an AND circuit 52 to generate a signal on a line 54 which passes to the binary encoder 26 to have the channel 3 address (which may, for instance, be $\mathbf{011_2}$) encoded onto the sampled channel adjust lines 28. The computer will then initiate an interruption to sample the data on channel 3, and when that request is suitably handled, the CPU will provide the clear channel signal on the line 34. Because of the continued presence on the line 54, an AND circuit 56 will generate a clear channel 3 signal on a line 58 which is utilized in FIG. 3 (as described hereinafter) to turn off the channel 3 request signal on the line 22. The remaining channels operate in a fashion as just described with respect to channels 1–7, with the exception of channel 8 which need not generate a priority signal for any lower order channels and thus it is simply provided with an AND circuit 60 which corresponds to the AND circuits 44 and 52. Similarly, channel 1 requires no AND circuits equivalent to the AND circuits 44, 48 and 52 since it does not have to receive priority from any higher ordered channel. The manner in which the priority circuit of FIG. 2 will serve the objectives of the present invention is more easily appreciated after consideration of the operation of the circuitry of FIG. 3.

Figure 3:
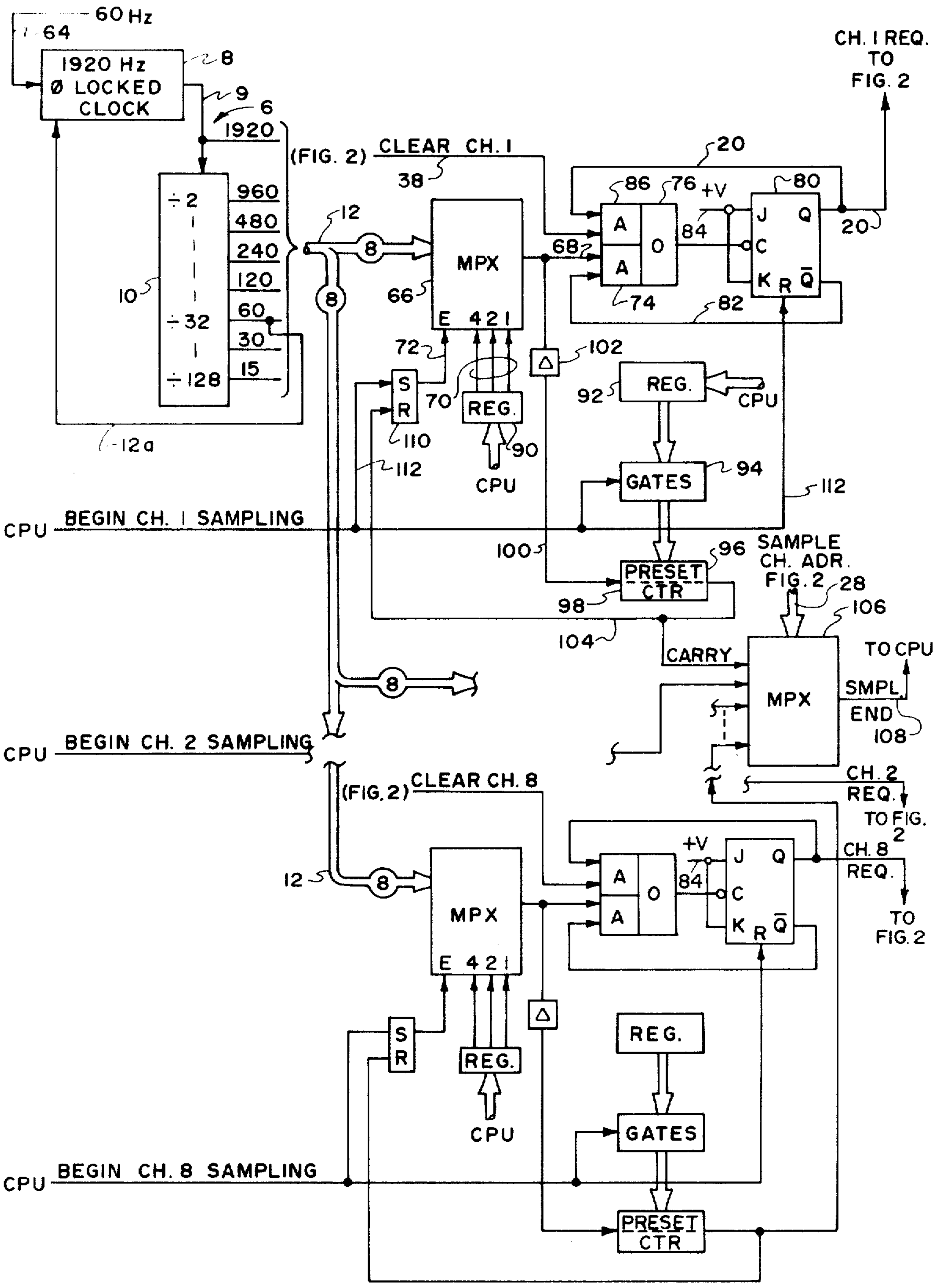
FIG. 3 is a schematic block diagram of exemplary channel request circuitry which may be used in conjunction with the priority circuitry of FIG. 2 in implementing the present invention.

The real time clock 6 is shown in the upper left corner of FIG. 3. The phase locked clock 8 may be of well known configuration which has a phase comparator responsive to a source of a basic frequency and a reference frequency to supply an essentially DC output, the magnitude of which is an indication of the difference in phase between the two signals, a low pass filter, and a DC amplifier feeding a voltage controlled oscillator, the amplifier and oscillator being so configured as to supply a signal of the desired frequency in response to an output from the phase comparator which indicates that the two signal inputs thereto are equal. Such a device may comprise, for instance, a signetics NE 565 phase locked clock. As illustrated in FIG. 3, the phase locked clock 8 receives a 60 Hz power signal on a line 64, as well as a 60 Hz feed back signal on the line 12*a*. The phase comparator responds to these two signals so as to insure that the output of the clock on the line 9 is at 1,920 Hz.

The frequency divider 10 may simply comprise an eight bit binary counter, the lowest stage of which divides the frequency by two and the highest stage of which divides the frequency by 256; the fifth stage divides the frequency by 32 and thus provides the 60 Hz necessary for feed back to the phase locked clock.

For simplicity in the description herein, apparatus of FIG. 3 (other than the real time clock 6) is limited to that for channel 1 and channel 8; however, other channels would have the same apparatus as that which is described hereinafter with respect to channel 1, and as also illustrated for channel 8.

The different frequency clock signals on the eight lines 12 are applied to a programmable multiplexer 66 which is equivalent to an 8 position switch so that any one of the eight lines 12 may be selectively connected to a single output line 68. The selection of the one out of eight lines for connection to the output lines 68 is in response to a binary coded input on a plurality of lines 70. Thus, inputs on the lines 70 representing $\mathbf{001_2}$ may cause the 960 Hz signal line 8 to be connected to the multiplexer output line 68, and input code on the line 70 of $\mathbf{101_2}$ may cause the 60 Hz line to be connected to the multiplexer output line 68, and an all zero input on the line 70 may cause the 1,920 Hz signal on a related one of the lines 12 to be connected to the output line 68. In addition, the multiplexer 66 has an enable input on a line 72. Such a multiplexer is well known and may comprise for instance a Fairchild 3705. The signal on the line 68 feeds an AND circuit 74 which in turn feeds an OR circuit 76, the output of which is connected to the clock input 78 of a standard JK flip-flop 80. If the flip-flop 80 is in the reset state, then there will be a signal on a line 82, which is also applied to the AND circuit 74. In such a case, the AND circuit will pass a signal through the OR circuit 76 to the clock input 78 of the flip-flop 80 causing it to reverse its state. This is so because both the J and k inputs are connected to a source 84 of a suitable voltage, which may for instance comprise plus 5 volts. As is known, with both the J and K inputs enabled, any clock pulse received at the clock input causes the flip-flop to reverse its state. When the flip-flop is turned into the ON state, the channel 1 request signal is generated on the line 20 for application to the circuit of FIG. 2, as hereinbefore. It is also applied to an AND circuit 86 which, in response to a clear channel 1 signal on a line 38 from FIG. 3 will cause the OR circuit 76 to again toggle the flip-flop 80 so as to return it to the reset state.

In order to particularly tailor the apparatus 66-86 described hereinbefore for use with a particular channel at a particular sampling frequency and for a particular number of samplings in response to each demand to begin sampling, a pair of registers 90, 92 may be provided to retain, respectively, encoded indication of the frequency at which this set of apparatus is to operate, and the number of samplings which are to be made in response to any demand for sampling. These registers may be set by the CPU, or, if desired, in any other fashion caused to provide a suitable code representative of the frequency and a number of samples, respectively. The register 90 provides signals on the lines 70 so as to program the multiplexer to select the desired one of the input lines 12 so as to have the correct frequency at its output line 68. The register 92 is applied through a plurality of gates 94 to the preset inputs 96 of a counter 98. The counter 98 is advanced by a signal on a line 100 which is provided by a delay unit 102 in response to each clock signal presented by the multiplexer 66 to its output line 68. Thus, the counter 98 counts the clock pulses that appear after the gates 94 are enabled to preset the counter 96. Once the counter 96 continues to count to its capacity, it provides a carry signal on a line 104 which indicates that the required number of samples have been made and that no further samples should be made for that channel until a new request therefore is received. The signal on the line 104 is applied to a multiplexer 106, which is of the same type as the multiplexer 66, the enable input of which is hard wired so that the multiplexer is continuously enabled, and the programming of which is in response to the sampled channel address output of the priority circuit of FIG. 2 on the lines 28. Thus whenever priority is allocated to channel 1 the multiplexer will connect its output line 108 to the line 104 so that when the carry is sensed it will generate a sample and signal which goes to the CPU to indicate that channel 1 is through sampling. This signal may be utilized to alert a display or other conditions at a terminal related to channel 1 so that futher operations may proceed. In addition, the carry signal on the line 104 is applied to reset a bistable device such as a latch 110, which, when in its set state provides the enable signal on the line 72. The latch 110 is set by a begin channel 1 sampling signal which is supplied by the CPU on a line 12. This signal is an indication that an operator has pressed a key at a console related to a terminal which is connected to channel 1 for inputting data to the CPU, or indicates a similar circumstance under which the computer determines that channel 1 should be sampled. The signal on the line 112 is also used to cause operation of the gates 94 so as to preset the counter 98 to the number of samples required for channel 1 as determined by the register 92. In addition, the signal on the line 112 may be applied to a forced reset input of the JK flip-flop 80, if desired, to insure that the repetitively-toggled condition of the flip-flop 80 has left it in the reset state, whereby the first clock signal on the lines 68 will cause setting (rather than resetting) of the flip-flop 80 for desirable operation.

Consider now a sequence of operation relative to channel 1. The real time clock 6 is, and has been, continuously presenting clock signals of various frequencies on the lines 12. Control channel 1 is caused to initiate sampling, the flip-flop 110 is in the reset state thereby not presenting an enable signal on the line 72 to the multiplexer 66 so that nothing is connected to the output 68 of the multiplexer. At some point in time, and it is immaterial when, the CPU presents a begin channel 1 sampling signal on the line 112. This gates the content of register 92 to preset the counter 98, assures the resetting of the flip-flop 80, and sets the latch 110 thereby enabling the multiplexer 66. The very next clock pulse that appears on the one of the lines 12 which the multiplexer, in response to the continuous presentation of a code on line 70, causes to be presented to its output 68 will operate the AND circuit 74 so as to toggle the flip-flop 80 into the set state. This will cause the channel 1 request signal on line 20 to be applied to FIG. 2, so that the binary encoder 26 sends a code for channel 1 over the lines 28. These not only are applied to the CPU to indicate that a data input interrupt for channel 1 is requested, but also is applied to the multiplexer 106 in FIG. 3. As soon as the CPU has acknowledged, or completely handled the required interrupt in order to sample channel 1 (the particular nature of the CPU operation required depending upon the particular computer involved), it will present the clear channel signal on the line 34 (FIG. 2) thereby operating the AND circuit 36 so as to generate the clear channel 1 signal on the line 38. This is applied in FIG. 3 to the AND circuit 86 to again toggle the flip-flop 80 so that it returns to the off state thereby removing the channel run request signal on the line 20. If in response to the same clock signal one of the other channels were to be sampled, its multiplexer would similarly have passed a signal on the line 68 to set its flip-flop. It woild have generated a request signal (for instance a channel 3 request signal on the line 22) (FIG. 2). However, the AND circuit 52 would not have operated until completion of the operation just described for channel 1, and, if channel 2 also used that clock pulse, for completion of a similar operation for channel 2 so that the channel 3 priority signal would be available on the line 50. And notice that is immaterial whether all three channels are on the same frequency, since if at channel 1 was operating at a 30 Hz frequency, channel 2 at a 60 Hz frequency, and channel 3 at a 120 Hz frequency, a 30 Hz clock pulse would cause all three channels to sample. Of course, when the 120 Hz clock pulse comes along, then requests are not lodged for those channels using the 30 Hz and 60 Hz pulses only.

Thus the functions performed are steadying the latch 110 when sampling is to begin, counting each sample by the counter 98, and resetting the latch 110 when enough samples have been taken. The flip-flop 80 is set by a clock signal of the correct sampling rate or frequency whenever such a signal appears provided the multiplexer is enabled by the latch 110. However, the request as manifested by the flip-flop 80 is not acted upon until any higher-ordered channels in the priority scheme of FIG. 2 which have made requests have been acted upon. If higher-ordered channels have not made requests, then the request for a given channel will be acted upon immediately. Once the request is acted upon, the address of the selected channel goes to the CPU so the CPU can perform the required interrupt, after which the CPU generally indicates clearance of all channels so that the selected channel generates a clear signal restoring its request flip-flop 80 to the off state. After that nothing happens for the given channel until once again the related line presents a clock pulse at the desired frequency.

If desired, the registers 90, 92 could be set each time that a sample is requested, if desired. In fact, if the apparatus herein, rather than being discreet special purpose dedicated hardware as shown in FIGS. 2 and 3, were to be provided from multi-function, similar apparatus by means of programming of a computer, it is more likely that the registers 90, 92 would be reset in each case. Similarly, the general purpose logical circuits of a computer could be utilized, along with suitable programming, to provide the other functions required. Utilization of buffer storage, with suitable programming, could keep track of the number of samples required in a number which have been made for the current request. In other words, it is immaterial whether the functions of FIG. 2 and 3 are provided by hardware such as that illustrated, or by the commensurate hardware of a CPU together with suitable programming.

As described hereinbefore, one aspect of the present invention is sampling the data input channels at a 60 Hz rate so as to minimize noise induced therein as a result of power lines and fluorescent lighting. Since the apparatus of FIGS. 2 and 3, in commensurate apparatus in an embodiment employing software of a computer, operate at electronic speed (on the order of microseconds) a high level of noise rejection can be realized. If desired, phase adjustment may be provided to provide a rough focus of the precise timing of the real time clock 6 with respect to the actual sampling times which can be achieved by the computer in response to the functions of the present invention.

Thus, although the invention has been shown and described with resect to an exemplary embodiment thereof, it should be obvious to those skilled in the art that the invention may also be implemented by means of suitable programming of a computer which is provided with the phase locked clock 6, and that the foregoing with various other changes and omissions in the form and detail thereof may be made therein without departing from the spirit and the scope of the invention.

Having thus described typical embodiments of my invention, that which I claim as new and desire to secure by letters Patent is:

1. In electronic data processing apparatus including a plurality of data input channels which may require service at random times as indicated by sample request signals generated therein and which provide data at a plurality of data sampling rates, a computer having input data sampling means for sampling data provided by said input channels at a rate significantly higher than any of said sampling rates, and a real time clock, the method of controlling computer interrupts for sampling data input channels, which comprises the steps of:

a generating a plurality of distinct clock signals at different frequencies, said frequencies including a given frequency and multiples and sub-multiples of said given frequency and said frequencies relating to different sampling rates at which various ones of said data input channels are to be sampled;

b registering sample request signals from one or more data channels;

c in response to the concurrence of a registered sample request and one of said distinct clock signals at the frequency corresponding to the data sampling rate of the input channel related to the registered sample request, generating computer interrupt signals to cause said input sampling means of said computer to sample the data at the related one of said data input channels.

2. The method according to claim 1 wherein said step (c) comprises:

in response to registered sample requests for sampling two or more of said data input channels, generating electric signals defining an ordered sequence of generating computer interrupt signals in response to said registered sample requests concurrently with ones of said distinct clock signals relating to the data sampling rates of the data input channels for which the sample requests have been registered.

3. The method according to claim 1 comprising the additional steps of:

registering, for each data input channel, the number of data samples required as a result of a single registered sample request;

counting the number of said clock signals which occur at the frequency related to the data sampling rate of each of said channels for which a sample request is registered; and generating said interrupt signals for each of said channels repetitively until the number of said interrupt signals for each of said channels equals the registered number of required samples.

4. The method according to claim 1 wherein said real time clock includes a phase locked clock having a reference signal input, the output of said phase lock clock being connected to advance a frequency dividing counter, and wherein said step of generating clock signals comprises:

applying a clock signal derived as an output of one of the stages of said counter as a reference signal for phase locking said phase locked clock.

5. The method according to claim 4 wherein said phase locked clock is driven by a 60 Hz power signal, said frequency dividing counter comprises a binary counter, and said applying step comprises applying the output of the Nth stage of said counter as a phase reference to said reference input for phase locking said clock, whereby said clock produces signals to said counter which are two to the Nth times 60 Hz.

6. The method according to claim 1 wherein there is provided clock pulses at 60 Hz, multiples of 60 Hz, the submultiples of 60 Hz.

7. Electronic data processing apparatus comprising:

a plurality of data input channels each of which may require service at random times, each indicating that service is required by issuing a sample demand signal, and at least some of which provide data at data sampling rates different from others thereof;

a real time clock for generating a plurality of distinct clock signals at different frequencies, said frequencies including a given frequency and multiples and sub-multiples of said given frequency, said frequencies relating to different data sampling rates at which corresponding ones of said data input channels are to be sampled; and multi-function data processing means including input data sampling means for sampling data provided by said data input channels, and means for registering demands to sample the data of one or more of said data input channels and for generating, in response to the concurrence of a registered sample demand and one of said distinct clock signals at the frequency corresponding to the data sampling rate of the related data input channel, interrupt signals for indicating that a unit of data at the related data input channel is to be sampled by said input data sampling means.

8. Apparatus according to claim 7 wherein said real time clock provides clock signals at 60 Hz, multiples of 60 Hz, and sub-multiples of 60 Hz.

9. Apparatus according to claim 7 wherein said multi-function data processing means includes means responsive to said real time clock and to said registering means for generating, in response to demands for sampling two or more said input channels, said computer interrupt signals in an ordered sequence in response concurrence of individual ones of said demands with ones of said distinct clock signals related to the data sampling rate of the data input channels corresponding to the demands.

10. Apparatus according to claim 7 wherein said real time clock includes a phase locked clock having a phase reference input and a frequency dividing counter, one of the stages of said counter being connected to the phase reference input of said phase locked clock as a reference signal for phase locking said phase locked clock.

11. Apparatus according to claim 10 wherein said phase locked clock is driven by a 60 Hz power signal, said frequency dividing counter comprises a binary counter, and the output of the Nth stage of said counter is connected to the phase reference input of said phase locked clock, whereby said clock produces signals to said counter which are two to the Nth times 60 Hz.

* * * * *